United States Patent Office 2,853,049
Patented Sept. 23, 1958

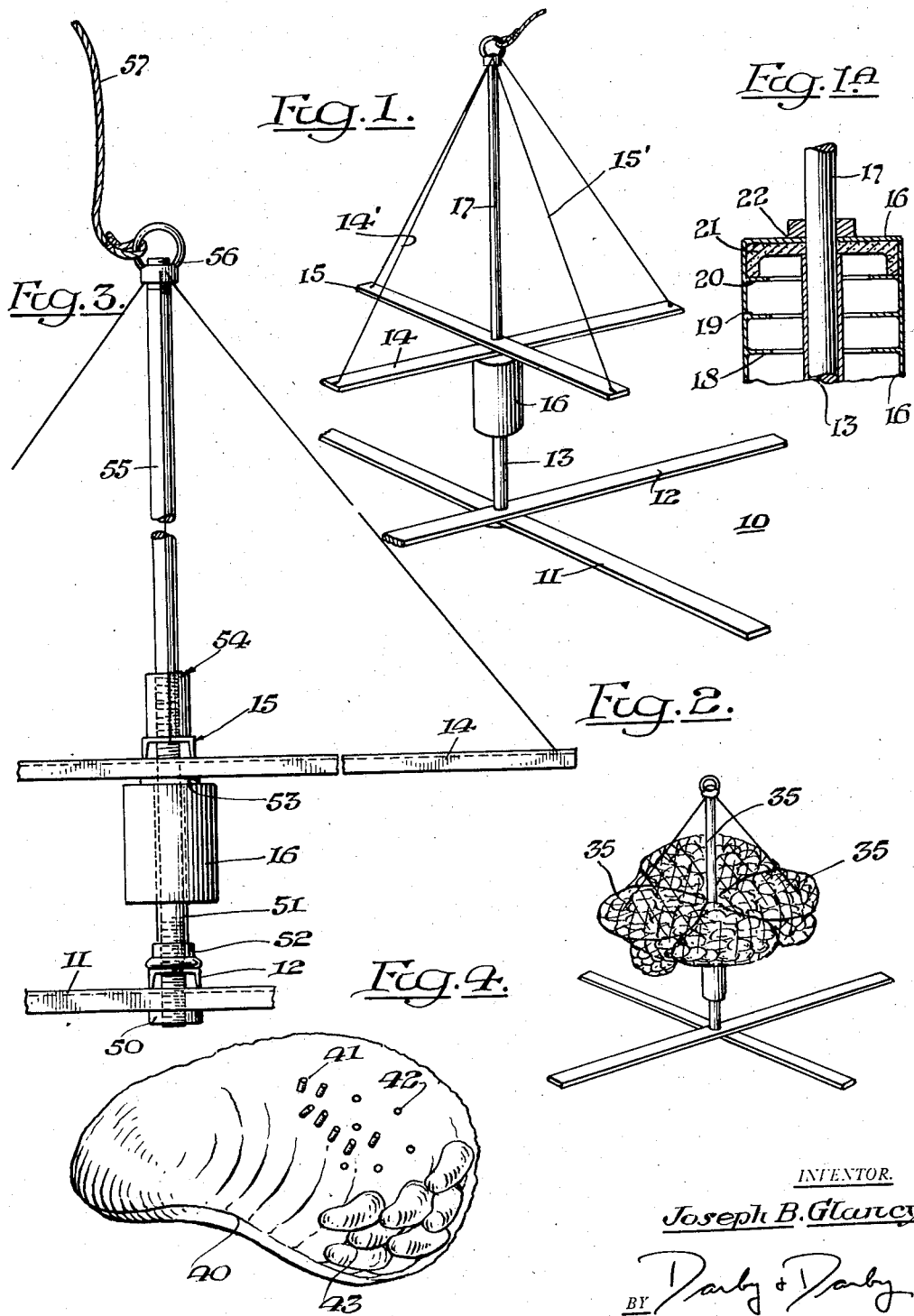

2,853,049
APPARATUS FOR THE PRODUCTION, COLLECTION, AND PROTECTION OF OYSTER SET
Joseph B. Glancy, Northport, N. Y.
Application December 2, 1953, Serial No. 395,827
9 Claims. (Cl. 119—4)

This invention relates to a method of collecting and protecting oyster set and to apparatus for so doing and for protecting young oysters.

In the United States the principal factor limiting the production of market oysters is the lack of seed oysters.

I have observed from experience and study that, if it were not for the depredation of drills on young oysters, seed oysters could be produced by conventional methods in sufficient quantity to supply the needs of oyster growers. I have observed also, through microscopic studies, that in the general region of oyster grounds there are usually sufficient numbers of oyster larvae which set each year to produce ample spat which, if it were not destroyed by drills, particularly young drills, would insure adequate supplies of seed oysters to increase production of market oysters.

I have seen on many occasions heavy oyster setting on shells, rocks, and even on adult oysters, which was destroyed by drills before attaining a size large enough to be seen by the practical oyster growers. Drills literally saturate all oyster beds and areas where water salinities are in excess of about 10 to 15 parts per thousand. Indeed, due to drill depredation on the more saline areas, seed oysters are now produced largely on the lower salinity areas.

Drills have no free swimming existence as does the oyster. The method of reproduction of Urosalpinx and Eupleura drills is to climb onto some object, preferably the oyster itself, to feed and lay its eggs which are encased in firmly attached, tough plastic-like capsules from which the young drills emerge about one month after ovulation. Therefore, in order for drills or their progeny to attain a position of attack, they must be able to crawl to their prey.

It is accordingly a fundamental object of my invention to provide an apparatus and method for cultivating oyster set so that the progress of the drills, young or old, is impeded in a manner such that they cannot reach an attacking position to destroy the oyster set.

It is another object of the invention to provide an apparatus suitable for placing on the bottom in an appropriate oyster-growing area, to rest at a level such that no interference with navigation occurs, yet may be of a size convenient for handling by conventional oyster dredge boat techniques.

It is another object of the invention to provide a form of apparatus which will support the cultch (material for oysters and other shellfish to set on) off the bottom, preferably open-mesh bags of shells of oysters, clams, scallops, or mussels. These are the by-product of the harvesting operations and the apparatus so placed in the water that it may be recovered conveniently.

Other objects and advantagse of the invention will in part be obvious and in part appear hereinafter.

My invention, accordingly, comprises the method of obtaining oyster set and preserving it, which includes placing bags of shells, or other appropriate objects, as a cultch at fixed points along the bottom during spawning time, collecting thereon oyster set and bringing said cultch to appropriate growing grounds and providing a mechanism for supporting the cultch under water in a position that it is clear of the bottom and cannot be reached by drills, yet is in a suitable position such that it will not be disturbed by ordinary wave motion. The invention accordingly is embodied in the method comprising the steps and combinations of the steps utilized in preparing oyster cultch and in the apparatus having the features of construction, combinations of elements and arrangements of parts hereinafter set forth in greater detail.

In the drawings, constituting an illustration of the invention.

Figure 1 represents a perspective view of the apparatus;

Figure 1a is a central longitudinal section thereof;

Figure 2 is a drawing showing the placement of a group of bags of cultch on the support;

Figure 3 is a section through the apparatus showing in detail a baffling arrangement immediately below the supporting cross-bars for the oyster cultch; and Figure 4 is an illustration of oyster shells having set thereon and drill egg particles.

Referring to the drawing, in Fig. 1, 10 represents the ocean bottom in water of appropriate salinity, and 11 and 12, respectively, represent cross-bars formed of angle irons fastened together to form a wide-spreading base, which, generally, will be found most useful and convenient when the arms are approximately 6 feet in length. Centrally connected at the juncture of the crosspieces is a vertical support 13 which extends upward a distance determining the height of the cross-bars 14 and 15 which are shorter than the base. This second set of cross-bars serves to support the bags of cultch mounted on the vertical support. In an inverted position immediately under the point of connection between the cross-bars 14 and 15, and the vertical support, is the baffle member 16, which has the form of an open-ended cylinder having the open end directed downwardly toward the base of the device. The remainder of the device is a continuation 17 of the support 13, which with guy wires 14' and 15' serves as an anchor to which bags of shells may be fastened. At the top it may be provided with a loop for receiving a line to raise and lower it in the water.

The cylinder 16 may be internally baffled in any desired manner, as at 18, 19, 20 (Fig. 1a), to provide a long, tortuous passage from its open mouth to the closed end thereof, and at 21 and around the inner face of the baffle there is thus provided support for the placement of poison. It is apparent from the section shown in Fig. 1a that the only point of contact between the baffle member and the vertical support 13 is at 22 and that the only route therefore from the ocean bottom to the top of the support would be up the support 13, around the baffle 16 and then back on to the vertical support 17 to its top. It is by inclusion of a poison in the area set off by the baffle that the progress of drills is obstructed.

In Fig. 3 the detailed section through the support illustrates a preferred form of construction for the device. Though it is understood that the cross-arms 11 and 12 may be integrally joined to the support 13 and that the cross-arms 14 and 15 may be integrally joined thereto, this form of construction makes storage of the devices in off-seasons awkward. The preferred demountable structure shown in Fig. 3, utilizes cross-arms 11 and 12 connected to the vertical support by means of a structure which consists of a long bolt 50 enclosed within a cylinder or pipe 51, which is threaded into flange 52 at the base thereof. The upper end of pipe 51 forms a bearing surface or ledge upon which rests the receptacle 16. The bolt 50 extends upward past the level of the horizontal supports 14 and 15 and serves to close receptacle 16 tightly with the washer 53, which is clamped between the supports 14, 15 and the baffle 16 and secured closely in place by sleeve nut 54 which is threaded onto the bolt 50. To complete the upper section of the vertical support, a second bolt 55 of an appropriate length is threaded into the remaining portion of the sleeve nut 54 and at its upper end an appropriate ring 56 may be provided for receiving the lowering and raising rope 57.

Figure 4 illustrates diagrammatically an oyster 40, having deposited thereon a group of capsules 41 to represent the form of capsule or sheath in which the drill eggs are deposited. The holes 42 are somewhat exaggerated illustrations of the kind and size of perforation which the drill will make in the oyster shell. After the drill perforates the shell it sucks out the oyster meat. Young oysters are indicated at 43.

In use, the stand is loaded as shown at Fig. 2, by mounting a plurality of bags 35 of shells, whether they be oyster, clam or scallop shells, on the upper cross-arms, the bags being formed of an open chicken-wire mesh. The number may be varied for convenience in operation, but usually it will be found that about 12 bags placed on a single support makes a convenient load for the usual oyster dredge boat.

In operation I have found that the most practical form of cultch is this group of open-mesh bags of shells which are generally the by-product of the culling and shucking operations at oyster processing plants, but other solid collectors, such as cans, paper crates dipped in lime, cement, sand, sheet iron and tin scrap, and any other materials which form a loose, hard surface, which provides an ample opportunity for the semi-microscopic oyster larvae to attach to, may be used. For convenience, they are enclosed in wire mesh bags of poultry netting, although mesh bags made of special water resistant papers, natural and synthetic fibres may be used.

As will be seen from the drawing and the description of the apparatus, the collector itself comprises two or more cross-bars of sufficient width to prevent the collector from sinking deeply in the bottom, the arms being of adequate length to prevent the collector with its load of cultch from toppling over in even a strong current. The uprights support the cross-bars on which the cultch is placed. When the cultch and support are placed on the bottom, it is lowered directly downward so that within the baffle 16 there is trapped the amount of air which a container of that size normally holds. The air remains trapped therein when the stand is placed on the bottom. When the stand is so placed in water the only path which drills can take from the ocean bottom to the oyster cultch is up the support, across the inside closed end of the baffle, through the trapped air, and down the inside of the baffle and up over the outside to reach the cultch which has the young oyster set on it. The purpose of the baffling within the baffle 16 is to prevent significant exchange of water between the inside and the outside of the container so formed and, generally, this is reduced to practically none. The baffling further reduces the progress of the crawling drills and functions, in addition to being a water retardant, as a labyrinth against the drills' progress.

Within the baffle itself is placed a lethal barrier. A simple method of producing a lethal effect is to introduce, before lowering the collector in the water some slightly soluble organic or inorganic compounds which gasify by hydrolysis or react with oxygen to lower oxygen tension in the liquid enclosed in the inverted container and, since all animals must have oxygen, the drills are prevented from crawling. Gases such as carbon dioxide and ammonia are produced from decomposing organic matter by both aerobic and anaerobic bacteria. The entrapped gaseous layer then has the effect of anaesthetizing or killing the drills, causing them to drop back to the bottom. Organic and inorganic compounds which hydrolyze to produce hydrocyanic acid may also be used.

An alternative method of preventing the drills from climbing up the support inside the container is to coat the support, itself, and the inside surfaces of the baffle with toxic materials such as copper paint mixed with grease, which contains antifouling materials or insecticides, such as DDT and others, and also contains copper and mercury salts. An important part of the invention is that the gaseous upper contents of the can prevent the toxic coating upon which the drills must crawl, if they are to reach the young oyster set, from dissolving and gradually leaching out into the outside water. The toxic coating may contain, among other substances, copper compounds such as copper sulphate and copper oleate; mercuric compounds such as mercuric chloride, phenyl mercuric salicylate, and mercuric oleate; insecticidal agents such as DDT; and magnesium sulfate (Epsom salts). This latter chemical, magnesium sulphate, prevents crawling since the foot of the drill is lined with cilia, enabling it to crawl, and magnesium sulphate inactivates the cilia. To prevent algal growths, algicides, such as 2.4.D are also incorporated in the toxic coating. To prevent fouling growth such as barnacles, "deckers" (crepidula), "jingles" (anomia), hydroids, bryozoa and ascidian from setting on the outside of the baffle, a coating of anti-fouling paint is used, as well as on the lower part of the support or supports.

The nature of the lethal barrier which is placed within the baffle and is identified in Fig. 3 as a coating 32 may be any of a variety of chemical compositions. Fundamentally practically any of the inorganic compounds useful as pesticides will be effective, thus alkali metal fluorides, arsenates, copper fluorides and arsenates, and any of the usual copper compounds used in copper base anti-fouling paints may be incorporated in a paste or gum, e. g., petroleum jelly, gum tragacanth, to form a non-drying paste which is smeared in the area identified within the baffle. Organic pesticides such as DDT, 2,4–D, lindane, and other compounds of that nature also may be used. Where it is desired to generate a foul atmosphere and to reduce the oxygen tension in the entrapped air a specimen of organic matter which will decompose, to form ammonia and carbon dioxide and consume the oxygen trapped in the device, may also be used.

It is possible to include compounds such as sodium cyanide or calcium cyanide or organic nitriles which will hydrolyze in the moist atmosphere within the baffle to generate a low concentration of hydrocyanic gas within the atmosphere trapped within the container.

Another object of my invention is to kill drills on the oyster bed while the collector functions to catch oyster set, and to kill drills on oyster ground. It is known that drills by power of scent are attracted to young oyster set. The mollusc set on the cultch acts as bait and when the drills crawling up the support come in contact with the toxic coating, they withdraw their feet inside their shells and carry in some of the toxic compound. The poisoning effect of the toxic substance causes the drill to close the operculum, insuring that poison is carried into the visceral mass of the drill, thus destroying it. On oyster ground the apparatus, baited with young oysters or drill food, or chemical attractions, will destroy drills in the same manner.

The invention has the advantage over the conventional method of broadcasting shells on the bottom or placing shells in furrows on the bottom, or in open mesh bags or containers on the bottom, that the collectors can be placed on almost any types of bottom, from hard sandy areas to soft mud bottoms, and even mildly shifting bottom, which it is impossible to plant or use with conventional techniques. For soft, muddy and mildly shifting bottoms, the lower cross-bearing elements 11 and 12 are lengthened or widened to increase the bearing surface.

The invention has the advantage over suspension of cultch from floats, vessels, and stakes, in that these floats, vessels, and stakes being on the surface or above impede and obstruct navigation. In addition, from a cost standpoint, the invention provides the most economical method when compared with suspension methods for cultch. The collector may have a height from 1½ feet to about 6 feet and by proper placement will not impede navigation. The collectors are placed in depths so that the top is at or below the level called for by the navigational charts of the United States Coast and Geodetic Survey. The collectors may be placed in fish trap areas or on beaches where the cultch may be above the water level for part of the tidal period.

The invention has also the advantage in set collection that it impedes and destroys other bottom crawling pests and enemies of oysters, such as starfish, crabs, worms, and others.

The invention provides a low-cost, convenient method of destroying young starfish which have a free swimming larval period somewhat like oysters and may set with them. When such occurs, as it may in saline waters in Long Island Sound for example, the intact collectors may be pulled up and dipped in a lime solution which immediately kills the starfish but does not harm hte oysters which will be closed tightly in their shells. Other enemith, such as encrusting and smothering growths, may be eliminated in this way. The collectors are placed back in the water for further spat collection and growth.

The invention has the further advantage over the conventional method of bottom set production in that the young oysters, being maintained off the bottom, grow faster and are kept free from feeding deposits and sediments, since greater water currents exist off the bottom, where the current is negligible or low because of bottom friction.

My method of oyster seed collection begins by assembling the stand and inverted baffle or container properly treated, as shown in Figure 1. Since the stands and container are to be used from year to year, it is important that they be collapsible so that they can be stored conveniently and handled easily between usage. The tightening of one nut 54 (Fig. 3) secures the frame and makes the baffle or inverted container 16 water and gas tight. Previously-made mesh bags, preferably of poultry wire netting of from 1" to 2" mesh, are filled with clean shells or other hard surface setting materials freed from live sea bottom animals, such as drills. The preparation of the shells is conveniently carried out by weathering them ashore for several months. These bags, the rough dimensions of which may be 10" in diameter by 36" in length, hold about one bushel of the cultch. The bags of cultch are placed on the upper cross-bars 14 and 15, two in parallel, alternating pairs to orient them crosswise to the lower two, the purpose being to permit freedom of circulation of water through the bags. Any convenient number of bags may be placed on the support, but 2 to 10 bushels are a reasonable load, because the weight of this amount is close to that handled by the hoists of conventional oyster boats. Individual collectors may be joined together as a unit if it is desired to use more powerful lowering and hoisting equipment. When the bags are in place on the cross-bars they are wired to the cross-bars and to the central upright, as indicated in Fig. 2, so that no part of the bags can touch the bottom. The upright 17 serves to hold the cross-bars and bags up off the bottom and, at the same time, serves as the member to which the lowering and hoisting line is connected.

The placing of the collectors in the water is delayed until as late as possible before the start of oyster setting to prevent heavy fouling of the cultch which might interfere subsequently with the oyster's setting and growth. After the oyster set has attached to the cultch, the collectors are left undisturbed, except for starfish elimination or other cleaning as described above, until the young oysters are about one inch in size. Usually in the oyster waters of the U. S. this takes about three months as this is the warmest period of the year when the oysters grow fastest. However, this is also the period of the year when the drills are most active. During this crucial period for the young, thin-shelled spat, they are protected from the ravages of drills. After about three months, the oysters which have set on the cultch have grown to such an extent they tend to crowd one another and it becomes desirable to spread them on oyster growing bottom to give them room for further growth. By this time, the oysters' shells have grown to a reasonable thickness and the drill activity at this time is inhibited by the colder water, so that it is safe to plant the oysters on the bottom. Even though a moderate amount of drill damage may subsequently occur, the oyster crop has emerged from the dangerous stage and may be grown to the adult size with excellent yields on an acreage basis. If so desired, oysters may be carried over the winter on the collectors, safe from drills, starfish, and other pests. They are then planted and the collectors charged with new cultch to obtain oyster seed during the next summer.

The method of using the collectors is always to lower them into water so that air is trapped in the baffle or inverted container 16. Usually they are arranged in trawl fashion with a line connected to the top of the upright member, to facilitate lowering and hauling. Spacing of the collectors may be from almost adjacent positions to a distance equal to the water's depth and greater so that individual collectors may be hauled up on deck without disturbing others. The collectors can be placed in waters of any depth ordinarily found in oyster waters of the United States and can be used in shallow waters along beaches where the top of the collectors may be exposed at low tide.

It can be seen that the collectors utilizing vertical layers of water have great advantage over the conventional methods of oyster culture which uses only the bottom layer. It is also evident that much greater use is made of any given area of oyster bottom. It is seldom that existing methods of oyster culture yield more than 1,000 bushels of seed oysters per acre. With my method and collectors, yields of 5,000 bushels per acre and more may readily be obtained.

The collectors may be used not only in gathering oyster set, but also for other molluscs such as mussels, scallops and clams. The technique for so doing is directly analogous to the collection of oyster set in that an appropriate cultch is set out in spawning waters during the spawning season. After an appreciable set has been obtained it can be moved to other grounds for further cultivation.

A very substantial degree of protective value can be obtained from the use of collectors as traps or eliminators for drills. The collectors may be set in waters which are infested with drills and baited, for example, with young oysters, which are attractive to the drills. By inserting a strong lethal poison such as a calcium or sodium cyanide composition in the trap on baffle 16 and maintaining the baited collector in the oyster waters it is possible effectively to collect a large number of drills. They are attracted to the young oyster set and in the instinctive drive to reach the set they climb the support and enter the poisoned area and accordingly are quickly killed.

Having described the invention in terms of a specific embodiment, it is to be understood that variation may be practiced without departing from the spirit or scope thereof.

What is claimed is:

1. An apparatus for setting young oysters and protecting them from their natural marine enemies, comprising a base, a vertical support secured to said base, means on said support for carrying young oysters, and a physical barrier against said marine enemies interposed between said base and said means, said barrier being open in the direction of the base and being concentric with the vertical support.

2. An apparatus in accordance with claim 1, in which said barrier includes means for carrying a deposit lethal to natural enemies of oysters.

3. An apparatus in accordance with claim 1, in which said base comprises a pair of arms secured to the vertical support.

4. An apparatus in accordance with claim 3, in which the support for young oysters is a pair of arms locked in place on said vertical support extending from said base.

5. An apparatus in accordance with claim 4, in which the barrier includes internal baffle members to create a labyrinthine structure.

6. An apparatus for collecting young oyster set comprising a base, a vertical support passing through said base and extending in an upward direction, a baffle, means on said vertical support for carrying said baffle, a horizontal support above said baffle, means for forming a water and air tight closure between said baffle and said horizontal support, and further vertical supporting means extending upwardly from said horizontal support.

7. An apparatus for collecting young oyster set, comprising a base formed of cross-arms of substantial extent, a vertical support fastened to said base at a point of intersection of said cross-arms and extending in an upward direction, a ledge around said vertical support at a level materially above said base, a baffle having the form of an inverted open-ended cylindrical container, the open end being downwardly directed, symmetrically placed around said vertical support and bearing on said ledge, a horizontal support comprising cross-arms mounted directly above said baffle on said vertical support, and a closure means engaging said vertical support and compressing said upper cross-arms and baffle against the ledge to form a water- and air-tight joint, and an additional vertical support extending upward from said closure means.

8. An apparatus for setting young forms of shell fish and protecting them from their natural marine enemies, comprising a base, a vertical support secured to said base, means located on said support for carrying young shell fish, and a barrier against said marine enemies located on said support between said base and said means for carrying shell fish, said barrier including means forming an enclosure open in the direction of said base and surrounding said support over a portion thereof spaced from said base, so that said enclosure is adapted to have air trapped therein when said apparatus is lowered into water.

9. An apparatus in accordance with claim 8, in which said barrier includes means for carrying a deposit lethal to said marine enemies.

References Cited in the file of this patent

UNITED STATES PATENTS

| 1,248,283 | Derck et al. | Nov. 27, 1917 |
| 1,815,521 | Miyagi | July 21, 1931 |
| 1,921,945 | Robertson | Aug. 8, 1933 |
| 1,933,950 | Wells | Nov. 7, 1933 |
| 2,181,882 | Flower | Dec. 5, 1939 |

FOREIGN PATENTS

| 7,076 | Australia | Apr. 30, 1928 |
| 11,516 | Australia | Sept. 25, 1928 |
| 855,799 | France | Feb. 26, 1940 |
| 118,442 | Australia | Apr. 20, 1944 |